3,366,561
IONIZING IRRADIATION POLYMERIZATION OF TRIOXANE WITH COPOLYMERIZABLE STABILIZING COMONOMERS
Nelson S. Marans, Silver Spring, Md., assignor to W. R. Grace & Co., New York, N.Y., a corporation of Connecticut
No Drawing. Continuation-in-part of application Ser. No. 182,126, Mar. 23, 1962. This application Apr. 12, 1965, Ser. No. 447,510
5 Claims. (Cl. 204—159.21)

This application is a continuation-in-part of application Ser. No. 182,126 filed Mar. 23, 1962, now abandoned.

The present invention relates to the production of copolymers of formaldehyde, and more specifically to copolymers of formaldehyde which possess an improved degree of thermal stability and superior physical properties.

It has long been known that valuable high molecular weight polyoxymethylene polymers may be obtained by polymerizing an oxymethylene precursor such as trioxane in the presence of suitable polymerization catalyst.

Early polyoxymethylene polymers while exhibiting many desirable physical properties were found to be extremely susceptible to thermal degradation. It was found that when heated, the polyoxymethylene molecular would tend to degrade (or unzip) with the evolution of gaseous formaldehyde. In order to retard the unzipping reaction which occurs when polyoxymethylene is heated, it has generally been the practice to copolymerize polyoxymethylene with a comonomer which acts as a blocking or capping agent. It is reasoned that a blocking or capping agent when bonded to an end of a polymeric polyoxymethylene chain will serve to protect the otherwise vulnerable terminal oxymethylene radical from removal.

While in practice it is found that comonomers do in fact render polyoxymethylene more stable towards unzipping reaction, it is also found that capping comonomers serve the adverse secondary function of blocking polymeric growth. This occurs when the reactive terminal polyoxymethylene radical is capped with a comonomer radical which, in addition to protecting the terminal oxymethylene radical from removal, also ties up the radical and terminates chain growth. Therefore, it is frequently found that stabilized copolymers of polyoxymethylene possess lower molecular weights and melting points than the corresponding homopolymers.

It is therefore an object of the present invention to provide a method for preparing polyoxymethylene copolymers which possess thermal stability and desirable physical properties.

It is another object to provide a high molecular weight polyoxymethylene copolymer which is stable at elevated temperatures and which possess a molecular weight within a desirable range.

These and still further objects of the present invention will become readily apparent to one skilled in the art from the following detailed description and specific examples.

Broadly the present invention contemplates a method for producing polyoxymethylene copolymers which comprises copolymerizing an oxymethylene yielding compound and a stabilizing comonomer in a solid state system which utilizes high energy irradiation as the polymerization initiation force.

More specifically the present invention involves copolymerizing an oxymethylene yielding precursor such as trioxane or other low molecular weight polyoxymethylene polymer and a stabilizing amount of a copolymerizable stabilizing comonomer such as a cyclic ether or a substituted vinyl compound, in the solid state wherein high energy irradiation is used as the polymerization initiator.

The process envisioned herein will produce a polyoxymethylene copolymer which possesses polyoxymethylene polymeric chains having a molecular weight substantially the same as a polyoxymethylene homopolymer which has been subjected to similar polymerization conditions.

It is found that the stable polyoxymethylene copolymer of the present invention may be conveniently produced by either one or two general preparative methods.

The first and perhaps the generally preferred procedure involves the steps of (1) blending from about 0.1% to about 5% of a comonomer with a mass of trioxane which has been heated to above its melting point, (2) cooling the comonomer-trioxane mixture to below its solidification temperature, (3) irradiating the solidified mixture with from about 0.01 to about 2.0 megarads of high energy radiation and (4) heating the irradiated mixture to a temperature of from about 25° to about 62° C. for a period of from about 0.5 to about 50 hours to allow polymer chain growth to occur.

An alternative procedure involves (1) irradiating trioxane in the solid state at room temperature with from about 0.01 to about 2.0 megarads of high energy radiation, (2) aging the irradiated trioxane at a temperature of from about 25° to about 62° C. for a time of 15 minutes to 5 hours to allow chain growth to occur, (3) blending the irradiated and aged polymer with from about 0.1 to about 5.0% of the stabilizing comonomer at a temperature above the melting point of the mass, and (4) aging the comingled mass at a temperature of from about 25° C. to about 62° C. for a period of from about 0.5 to about 5.0 hours to complete the polymeric growth.

Since the stabilizing comonomers do not cocrystallize with the trioxane, polymerization occurs within the trioxane crystal to form a large polyoxymethylene block before copolymerization or capping occurs with the comonomer. This permits practically the same degree of chain growth that would be expected in absence of comonomer. Therefore it is found that the molecular weight and melting point of the copolymer is approximately that of the corresponding homopolymer. By using the alternative method mentioned above, wherein some polymerization of the trioxane occurs before contact with the copolymerizable comonomer, it is found that a larger homopolymer block is formed, and a correspondingly higher melting point but somewhat less stable product is obtained. This is explained by the fact that a higher degree of polymerization is obtained before the chain stopping comonomer is added, which results in longer polymer chains but less copolymerization.

In general, in the above procedures the blending of the comonomer with the trioxane may be carried out at a temperature above the melting point of the trioxane (or partially polymerized trioxane) but below the decomposition temperatures thereof. Generally speaking temperatures in the neighborhood of about 75° C. are preferred in that higher temperatures may cause excessive loss of low boiling monomers or the partial thermal polymerization thereof.

When the comonomer-trioxane mixture is cooled to effect the crystallization thereof, temperatures in the neighborhood of room temperature (20–25° C.) are entirely satisfactory. Subsequent to crystallization the mixture may be subjected to irradiation at substantially the same temperatures achieved upon solidification (normally room temperature). The exact dosage of irradiation applied will depend on the degree of polymerization desired. In general, an irradiation dosage of from about 0.01 to about 2.0 megarads may be effectively used.

The aging step subsequent to irradiation wherein polymeric growth occurs is conducted at a temperature above about 25° C. but below the melting point of the polymer which is generally in the range of 25 to 62° C. A temperature range wherein a substantial rate of chain growth occurs is generally somewhat above 25° C. and optimum results are generally obtained at about 40° to 62° C.

Irradiation which is employed in the instant invention may be conveniently obtained from a Van de Graaff electron accelerator, however it should be understood that high energy particles such as protons, alpha particles and deutrons as well as neutrons may be used in the practice of the present invention. Furthermore, high energy particles such as X-rays and gamma-rays may be used to create the activated specie which is responsible for the polymerization of the herein intended compositions.

In general the stabilizing comonomers which may be utilized in the practice of the present invention are those which will react with the terminal oxymethylene radicals of a polyoxymethylene chain. In general preferred types of comonomers may be described as cyclic ethers having the formula

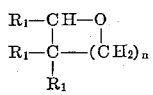

Having described the essential aspects of the present invention the following specific examples are given to illustrate specific embodiments thereof.

*Example I*

A series of 160 g. samples of trioxane was melted at a temperature of 90° C. and 3.2 g. (2% by weight) of epichlorohydrin, propylene oxide, diethyl maleate, N-vinyl pyrrolidone, 2-vinyl pyridine, and acrylamide were added to each. The mixtures were stirred for a few minutes to obtain homogeneous blends. The blended mixtures were then formed into plaques of 0.5 cm. thickness and allowed to crystallize at room temperature. The solid plaques were then irradiated at room temperature to a dose of 0.3 MR in a Van de Graaff electron accelerator. The irradiated plaques were then placed in 250 cc. screw cap bottles and aged at 55° C. for 5 hours.

The percentage conversions and melting points of the respective samples are given in Table I below. Furthermore, percentage weight losses are given for two selected times and temperatures which indicate that the thermal stability of the respective copolymers are superior to that of the corresponding homopolymer.

TABLE I

| Comonomer | Percent Conversion | RSV in γ-butyrolactone | M. P., °C. | 105° C. Testing, Percent Wt. Loss | | 150° C. Testing, Percent Wt. Loss | |
|---|---|---|---|---|---|---|---|
| | | | | 96 hrs. | 336 hrs. | 24 hrs. | 72 hrs. |
| None | 42.1 | 1.09 | 181–182 | 16.9±0.7 | 46.4±1.2 | 64.6±0.4 | 81.4±0.8 |
| Epichlorohydrin | 15.2 | 0.73 | 181–183 | 8.3±0.1 | 13.1±0.9 | 36.8±0.2 | 49 ±5 |
| Propylene Oxide | 37.6 | 1.22 | 183–186 | 14.7±3.6 | 43 ±8 | 97 ±2 | 98 ±2 |
| Diethyl Maleate | 21.9 | 0.66 | 180–183 | 14.4±0.2 | 26.4±0.4 | 58 ±3 | 73 ±5 |
| Vinylpyrrolidone | 16.3 | 0.86 | 182–184 | 7.6±0.4 | 10.6±0.5 | 24.2±1.2 | 32.6±1.9 |
| Vinylpyridine | 10.8 | 0.73 | 183–186 | 7.9±0.2 | 11.4±0.0 | 29.7±2.1 | 43.5±2.7 |
| Acrylamide | 8.4 | 0.31 | 180–182 | 18.0±0.6 | 24.2±0.4 | 42.8±1.0 | 59.3±0.4 | wherein $R_1$ may be hydrogen, alkyl having 1 to 16 carbon atoms, lower haloalkyl having 1 to 5 carbon atoms, lower alkoxy lower alkyl, lower alkoxyphenyl, and cyano lower alkyl and $n$ is an integer having a value of 0 to 1; unsaturated esters having the formulae

wherein $R_2$ is lower alkyl having 1 to 5 carbon atoms, $R_3$ is hydrogen or methyl, and $n$ is an integer having a value of 0 to 10; vinyl compounds having the formula

wherein $R_4$ may be phenyl, amido, pyridyl, pyrrolidinyl, alkyl having 1 to 10 carbon atoms, and cyano, and $R_5$ is hydrogen or methyl.

The copolymers produced by the present invention possess a novel fibrous-crystalline structure. When these fibers are examined by a standard X-ray crystallographic technique, they are found to possess an identity period of 14 A. along the fiber axis. That is, within experimental variation the identity distances found for the present copolymers are equal to or submultiples of an identity period of 14 A. On the other hand, it is generally known that copolymers of the same general chemical composition produced by conventional prior art methods, i.e. chemical induced polymerization methods, possess an identity period of 17 A. along the fiber axis.

The above copolymers when observed under the microscope are extremely fiberous in nature. A single crystalline fiber was isolated from the samples containing copolymerized vinyl-pyrrolidone and vinylpyridine. These crystalline fibers were then examined by a standard X-ray diffraction pattern technique which is generally disclosed in M. J. Buerger, X-ray Crystallograph (1942). In this example the specific X-ray radiation used was the K alpha doublet of copper. A rotating crystal X-ray camera having a 5.73 centimeter radius as manufactured by Charles Supper Company of Newton Centre, Massachusetts was used to record the diffraction pattern. The polymer material was mounted in a manner that positioned the polymer fiber axis co-axial with the rotation axis of the camera, and a diffraction pattern was prepared. The distances from an undiffracted spot on the photograph to each of the diffracted spots were measured.

Using the relation $T = \text{lambda}/\sin \tan^{-1}(Y/R)$ is a wave length of the radiation (1.543 A.) and R is the radius of the camera (5.73 cm.) identity distances for T were calculated from the measured values of Y. The values obtained for T for each example are given below.

Comonomer:                                Identity period (A.)
  Vinylpyrrolidone _____ 14.2±0.5
                                                7.0±0.2
                                                4.63±0.10
                                                3.5±0.08
  Vinylpyridine _____ 13.8±0.5
                                                7.1±0.2
                                                4.67±0.1
                                                3.50±0.8

Examination of the above data indicates that within experimental variations the identity distance is found or equal to or submultiples of an identity period of 14 A. along the polymeric fiber axis. Polyoxymethylene prepared by conventional chemical polymerization techniques possesses an identity period of 17 A. Therefore, it is seen that the present polymers possess a novel crystalline structure which is not supplicated by the prior art chemical polymerization means.

*Example II*

Several 160 g. samples of trioxane were melted and formed into solid plaques having a thickness of 0.5 cm. The plaques were then irradiated to a dose of 0.3 megarad at room temperature and then placed in 250 cc. screw cap bottles. The irradiated plaques were aged for 0.5 hours at 55° C. and subsequently melted at 75° C. and blended with 2% by weight of the comonomers disclosed in Example I. The blended samples were then allowed to solidify and then aged for 4.5 hours at 55° C. The respective percentage conversions, melting points, and thermal stabilities of the copolymers obtained by this process are disclosed in Table II below.

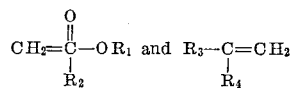

wherein $R_1$ is lower alkyl; $R_2$ and $R_4$ are selected from the group consisting of hydrogen and methyl, $R_3$ is selected from the group consisting of phenyl, amido, pyridyl, pyrrolidinyl, alkyl, and cyano, and $m$ is an integer having a value of 0–10, in the solid state wherein high energy ionizing irradiation is used as the polymerization initiator.

2. The method of claim 1 wherein the monomer is diethyl maleate.

3. The method of claim 1 wherein the monomer is N-vinylpyridine.

4. The method of claim 1 wherein the monomer is 2-vinylpyridine.

5. The method of claim 1 wherein the monomer is acrylamide.

TABLE II

| Comonomer | Percent Conversion | RSV in γ-butyrolactone | M. P., ° C. | 105° C. Testing, Percent Wt. Loss | | 150° C. Testing, Percent Wt. Loss | |
|---|---|---|---|---|---|---|---|
| | | | | 96 hrs. | 336 hrs. | 24 hrs. | 72 hrs. |
| None | 32.9 | 0.83 | 181–182 | 23.0±4.5 | 50±6 | 85.0±1.1 | 97.9±1.6 |
| Epichlorohydrin | 23.1 | 0.74 | 182–183 | 4.7±0.9 | 27±8 | 94.3±2.0 | 97.0±0.5 |
| Propylene Oxide | 21.1 | 0.94 | 182–185 | 8.3±1.7 | 33±15 | 58±5 | 67±5 |
| Diethyl Maleate | 27.0 | 0.92 | 182–184 | 8.4±1.6 | 25±5 | 78±6 | 87±4 |
| N-vinylpyrrolidone | 20.1 | 1.00 | 183–185 | 5.1±0.8 | 21±5 | 46±6 | 57±6 |
| 2-vinylpyridine | 20.9 | 0.91 | 184–186 | 4.06±0.00 | 6.8±0.2 | 43.6±1.2 | 56.6±1.2 |
| Acrylamide | 22.6 | 1.09 | 180–181 | 4.8±0.2 | 25±8 | 80±17 | 95±3 |

In general it is seen from the above examples that no reduction in melting point occur when copolymers in lieu of homopolymers are formed in accordance with the present invention. Furthermore, it is generally seen when the comonomer is added prior to irradiation a greater stabilizing effect is obtained than when the comonomer is added after some irradiation has taken place.

I claim:

1. A method for producing stable polyoxymethylene copolymers which comprises copolymerizing trioxane and from about 0.1 to 5.0 percent by weight of a copolymerizable monomer selected from the group consisting of

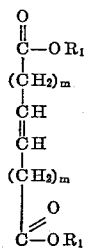

References Cited

UNITED STATES PATENTS 3,115,480  12/1963  Steadman _____ 260—67
3,194,510   7/1965  Brown _____ 260—73

OTHER REFERENCES

Okamura et al.: (V), Radiation Polymerization of Trioxane, Isotopes and Radiation, vol. 3, No. 5 (1960), pp. 416–417.

Okamura et al.: Annual Report of the Japanese Association for Radiation Research of Polymers. (I) vol. 2, October 10, 1960, p. 223, (II) vol. 3, 1961, pp. 213–219, (III) vol. 3, 1961, pp. 299–310, (IV) vol. 3, 1961, p. 311–317 (QD 601 AZN5).

MURRAY TILLMAN, *Primary Examiner.*

SAMUEL H. BLECH, *Examiner.*

N. F. OBLON, R. B. TURER, *Assistant Examiners.*